United States Patent [19]
Tanuma

[11] Patent Number: 5,490,161
[45] Date of Patent: Feb. 6, 1996

[54] SOLID-STATE LASER DEVICE WITH DIFFUSED-LIGHT EXCITATION, AND INTEGRATING SPHERE

[75] Inventor: Ryohei Tanuma, Kawasaki, Japan

[73] Assignee: Fuji Electric Co., Ltd., Kawasaki, Japan

[21] Appl. No.: 228,223

[22] Filed: Apr. 15, 1994

[30] Foreign Application Priority Data

Apr. 15, 1993 [JP] Japan ................................ 5-087675

[51] Int. Cl.⁶ .................................................. H01S 3/093
[52] U.S. Cl. .................................................... 372/72
[58] Field of Search .................................. 372/72, 70, 69

[56] References Cited

U.S. PATENT DOCUMENTS 5,263,042  11/1993  Kojima et al. ............................ 372/72

FOREIGN PATENT DOCUMENTS 2186685  7/1990  Japan .

OTHER PUBLICATIONS

"Solid–State Laser Engineering" by Walter Koechner; pp. VIII–XII, 1 and 335–341. (No Date).

Primary Examiner—James W. Davie
Attorney, Agent, or Firm—Brumbaugh, Graves, Donohue & Raymond

[57] ABSTRACT

In a high-efficiency solid-state laser device with an optical resonator including a solid-state laser medium in the form of a slab crystal, for example, a flash lamp serves as the excitation light source of the solid-state laser medium, and a reflector serves for injecting light produced by the light source into the laser medium. A reflector made of a foamed quartz glass has high diffusion reflectance over a wide range of wavelengths from the infrared to the ultraviolet. Foamed quartz glass is preferred also as an integrating sphere material for optical measurement.

4 Claims, 2 Drawing Sheets

SOLID-STATE LASER DEVICE WITH DIFFUSED-LIGHT EXCITATION, AND INTEGRATING SPHERE

BACKGROUND OF THE INVENTION

The present invention relates to solid-state laser devices and to integrating spheres.

On account of their compactness and ease of use, solid-state lasers as typified by the YAG laser have been used extensively and especially in the laser machining field. Recently, they have also found wide application in the measurement and medical fields.

A difficulty with solid-state lasers lies with raising their oscillation efficiency. Typically in solid-state laser devices, a laser medium is in the shape of a rod or a slab (plate), and an electric discharge tube, e.g., a krypton flash lamp disposed parallel to the laser medium, is used for exciting the laser medium to emit light for oscillation. For laser efficiency, attention is due the way exciting light is injected. For injection, reflectors made from various highly reflective materials have been used. Most common among these are gold-plated copper or brass reflectors. Also known are silver-plated reflectors and ceramic reflectors, for example.

A similar need for high reflectance arises with so-called integrating spheres as used in optical measurement systems. If a conventional optical detector is used for measuring light energy, for example, the measured value may depend on the size of a light-receiving surface and on the intensity distribution of incident light across the light-receiving surface. Thus, different beams with the same energy may produce different measurement readings. For more consistent readings, an integrating sphere can be used in which injected light is repeatedly and diffusely reflected at its inner surface so that the intensity distribution of the light is made uniform. For high reflectance of the inner surface of the integrating sphere, white coatings having MgO or $BaSO_4$ as their main component are typically used.

Gold-plated reflectors as mentioned above have desirably high reflectance especially for light of wavelength near 0.8 μm, which contributes greatly to the oscillation of YAG lasers, with little decrease in reflectance of the plated surface due to contamination and deterioration, for example. However, since there is considerable absorption loss for light in the 0.5 to 0.6 μm absorption band of Nd:YAG crystals, with the reflectance of gold-plated surfaces falling off at wavelengths below 0.6 μm, excitation efficiency remains limited. Furthermore, with laser crystals doped with $Cr^{3+}$ such as Cr:Nd:GSGG and $Cr:BeAl_2O_2$ (alexandrite), because of large absorption in the 0.5 to 0.6 μm wavelength band, gold-plated reflectors are not suitable for solid-state laser devices including such a crystal as laser medium.

As reflectors at short wavelengths, silver-plated reflectors are problematic because silver forms sulfides having decreased reflectance. This difficulty can be overcome, e.g., by coating the silver surface with a protective film of $SiO_2$, for example, or by silver-plating the back surface of a glass plate so that the silver surface does not come into direct contact with cooling water. In high-power lasers, however, silver-plate surfaces are less suitable because of the likelihood of damage caused by heat produced by the excitation light.

As reflector materials at short wavelengths, ceramic materials have also received recent attention, but the reflectance of such materials may not always be sufficient. Reflectance may be lower still with reflectors in which so-called free-cutting ceramics are used, made by dispersing ceramic particles in a glass matrix.

Similar difficulties arise with integrating spheres. Although, for weak light, the above-mentioned coatings containing MgO, $BaSO_4$, or the like are well suited, at higher powers their resistance too light becomes unsatisfactory.

SUMMARY OF THE INVENTION

A first object of the invention lies in remedying the above-mentioned difficulties with conventional reflectors for solid-state lasers and in providing a high-efficiency solid-state laser with a reflector which has high reflectance over a wide range of wavelengths extending from the infrared region to the ultraviolet region.

A second object of the invention lies in providing an integrating sphere having an inner surface of high diffusion reflectance which can withstand strong light such as high-power laser light.

In a preferred first embodiment of the invention, a solid-state laser device comprises an optical resonator including a solid-state laser medium, a light source for exciting the solid-state laser medium, and a reflector for injecting light from the light source into the solid-state laser medium, with foamed glass as reflector material.

In a preferred second embodiment of the invention, a solid-state laser device comprises an optical resonator including a solid-state laser medium, a light source for exciting the solid-state laser medium, and a diffusion reflector for injecting light produced by the light source into the solid-state laser medium, with a highly reflective material adhered to the back surface of the reflector.

In a preferred third embodiment of the invention, an integrating sphere in which a surface delimiting a spatial region having at least one light input/output opening is made of a diffusely reflective material, the integrating sphere being designed for making uniform the intensity distribution of light introduced through the input/output opening, and the diffusely reflective material comprising foamed glass.

DETAILED DESCRIPTION OF PREFERRED EMBODIMENTS

Figure 1A:
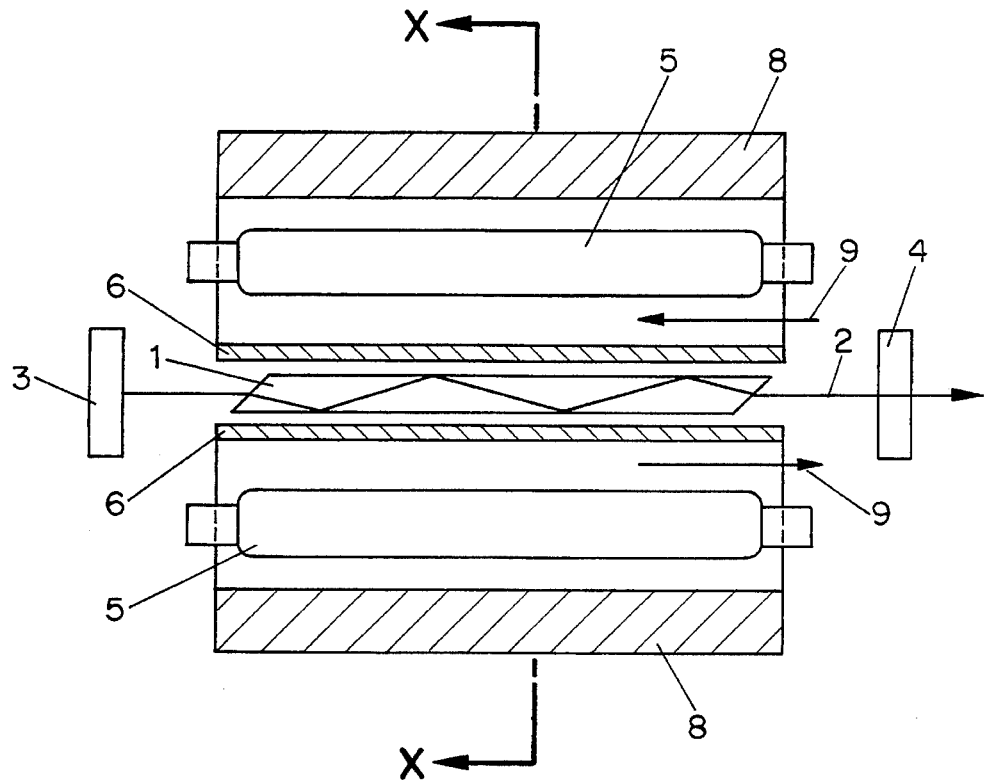
FIG. 1a is a longitudinal section of a preferred embodiment of a YAG slab laser of the invention.
Figure 1B:
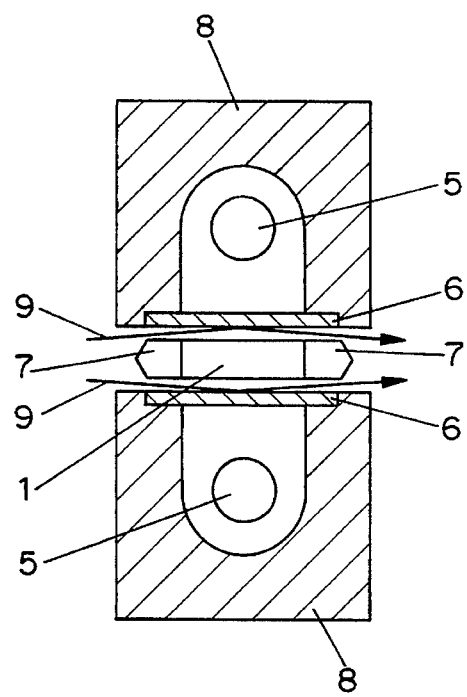
FIG. 1b is a cross section of the YAG slab laser of FIG. 1a, at X—X.

FIGS. 1(a) and 1(b) shows a YAG slab crystal 1 and laser light 2 propagating through the crystal 1 in a zigzag fashion. Shown further are totally reflective mirror 3, an output mirror 4, an excitation flash lamp 5, a Pyrex glass filter 6 for filtering out ultraviolet rays, an insulating material 7 on the sides of the YAG slab crystal 1, a reflector 8 made from foamed quartz glass, and flows 9 of cooling water. While some of the light produced by the excitation flash lamp 5 passes through the Pyrex glass filter 6 and enters the YAG slab crystal 1 directly, most of the light follows a more complicated path. Light follows various different paths: some light enters the YAG slab crystal 1 after being irregularly reflected by the foamed quartz glass reflector 8, for example, some is absorbed by the cooling water, some escapes through the cooling water entrances/exits, some escapes through the back surface of the foamed quartz glass reflector 8, and some enters the YAG slab crystal 1 but exits from the opposite side without being absorbed by the crystal.

With a conventional gold-plated reflector, the fraction of light absorbed by the reflector may be as much as approximately 50%. A large amount of excitation light is absorbed by the reflector because, as described above, there are many opportunities for light to be repeatedly reflected by the reflector, and because the reflectance of gold-plated reflectors drops off at wavelengths less than 0.6 μm.

By contrast, in this preferred embodiment of the invention, because absorption in the foamed quartz reflector 8 is low, the portion of light which is absorbed by the YAG slab crystal 1 is increased, and high-efficiency laser oscillation is facilitated.

Figure 2:
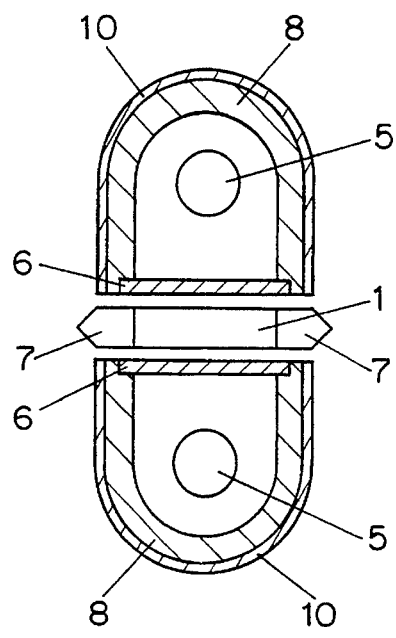
FIG. 2 is a cross section of an alternative preferred embodiment of a YAG slab laser of the invention.

In the embodiment illustrated by FIG. 2, the back surface of a reflector 8 made of foamed quartz has a silver-plate surface 10. Some of the light entering the reflector 8 reaches the back surface of the foamed quartz reflector 8, but, because this light is reflected by the silver-plate surface 10, light does not escape through the back surface. Thus, the reflectance of the reflector 8 is increased, and high-efficiency laser excitation is achieved. Since it is possible to make the foamed quartz of the reflector 8 thin, the size of the laser device can be reduced.

Figure 3:
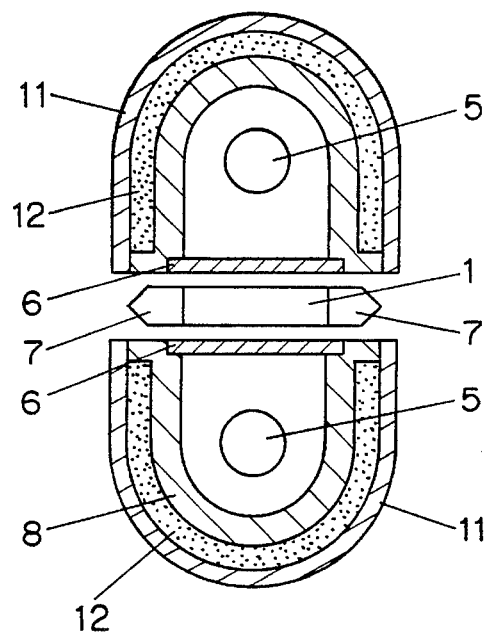
FIG. 3 is a cross section of a further alternative preferred embodiment of a YAG slab laser of the invention.

FIG. 3 shows magnesium oxide (MgO) powder 12 packed between a foamed quartz reflector 8 and a protective cover 11 which covers the external periphery of the reflector 8. Because the reflectance of the MgO powder 12 is high, light is prevented from escaping through the back surface of the reflector 8 as for the silver plated surface 10 in FIG. 2.

Figure 4:
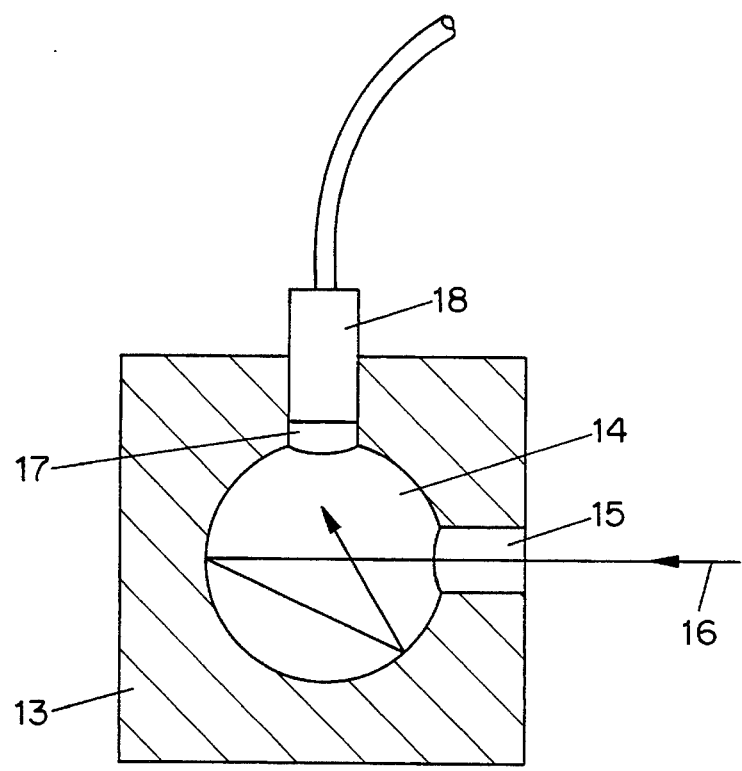
FIG. 4 is a cross section of a preferred embodiment of an integrating sphere for light measurement.

FIG. 4 shows an integrating sphere 13 with an interior spatial region 14, an incident opening 15 for laser light 16 to be measured, an emergent opening 17, and a light detector element 18 disposed in the emergent opening 17. The body of the integrating sphere 13 is made of foamed quartz.

Laser light 16 enters the spherical space 14 in the integrating sphere 13 through the incident opening 15 and reaches the emergent opening 17 after being repeatedly irregularly reflected by the inner surface of the spherical space 14. The intensity of the light in the emergent opening 17 is then detected by the detector element 18. Here, the foamed quartz glass, because of its high light-reflectance, repeatedly irregularly reflects the laser light 16 entering the integrating sphere, thus making the intensity distribution of the light uniform. Since the intensity distribution of the laser light entering the sphere does not affect measurement, high-precision measurements are possible. Furthermore, because the resistance of the foamed quartz to laser light is high, this integrating sphere can be used safely with high-power lasers.

In preferred embodiments, the foamed glass is a quartz glass, $SiO_2$, containing small bubbles of a few hundred microns in size, with specific gravity of one-tenth to one-half of ordinary quartz glass. Since this material has low thermal conductivity and is easily machinable, it can be used for thermal insulation, for example. Although ordinary quartz glass has high transmittance at wavelengths down to the ultraviolet region, foamed quartz glass has high reflectance due to the many internal solid-to-gas interfaces. This may be likened to the high reflectance of snow which is an aggregate of fine ice particles.

In the first embodiment, most of the light produced by the excitation light source does not directly enter the laser medium, but enters the foamed quartz reflector and is irregularly reflected by the minute air bubbles. Of the light that enters the reflector, most is reflected several times and then emitted outside the reflector. Some light is irregularly reflected many times, but, because the transmittance of quartz is essentially 100%, sooner or later this light is emitted to the outside also. To prevent undue loss of light through the back surface of the reflector, this quartz reflector must have sufficient thickness. Quartz is particularly suited as material for the foamed glass. However, if some light absorption at short wavelengths is tolerable, other glass materials such as Pyrex can be used instead. Because loss of excitation light in the reflector is almost eliminated in the first embodiment, high-efficiency laser oscillation becomes possible.

In the second embodiment, a highly reflective material such as silver is adhered to the back surface of a diffusion reflector made of foamed glass, for example. Whereas, with the foamed quartz reflector of the first embodiment, sufficient thickness is required to prevent light from escaping through to the back surface, in the second embodiment the reflectance is raised to prevent light from passing through the back surface, and high reflectance can be realized in a compact reflector for high-efficiency laser oscillation.

Advantageously for the diffusion reflector, foamed quartz can be used, or a free-cutting ceramic material. Also, besides silver as the highly reflective material, other materials can be used including powders of MgO or $BASO_4$, white coatings used for the inner surface coatings of integrating spheres, and highly reflective resins developed as reflector materials for use in lasers.

As mentioned above, when a highly reflective material other than gold is used as a reflector material for a solid-state laser, there have been a severe difficulties due to inadequate resistance to strong excitation light. With respect to this point, in the second embodiment most of the excitation light is reflected by the diffusing reflector, and the amount of light which reaches the highly reflective material on the outer side of the reflector is extremely small. Thus, because the highly reflective material is used only to reflect weak light which has passed through the diffusion reflector, a reflective material with lesser light resistance can be used. Also, because these highly reflective materials are adhered to the back surface of the diffusion reflector, without the reflecting surface making contact with cooling water or the like, materials such as silver can be used where surface deterioration would otherwise pose problems.

In the third embodiment, foamed glass is used as a diffusely reflective material in an integrating sphere. Because, as described above for the first embodiment, foamed glass is highly light reflective and also highly light resistant, an integrating sphere according to the third embodiment can be used with high-power laser light.

I claim:

1. A solid-state laser device comprising:

a solid-state laser medium;

a light source for exciting said solid-state laser medium; and means for injecting light produced by said light source into said solid-state laser medium, said injecting means comprising a glass reflector having a plurality of small bubbles therein.

2. The solid-state laser device of claim 1, wherein the glass reflector consists essentially of quartz glass having a plurality of small bubbles therein.

3. A solid-state laser device comprising:

a solid-state laser medium;

a light source for exciting said solid-state laser medium; and means for injecting light produced by said light source into said solid-state laser medium, wherein said injecting means is a diffusion reflector having a front surface and a back surface, said front surface facing the light source such that said reflector diffusely reflects said light produced by said light source, and said back surface having a highly reflective material adhered thereto.

4. The solid-state laser device of claim 3, wherein the diffusion reflector consists essentially of quartz glass having a plurality of small bubbles therein.

* * * * *